United States Patent Office 3,300,538
Patented Jan. 24, 1967

3,300,538
PURIFICATION OF PERFLUOROOLEFINS AND CHLOROPERFLUOROOLEFINS
Yutaka Kometani, Tatsuo Sueyoshi, and Masayoshi Tatemoto, Osaka, Japan, assignors, by mesne assignments, to Thiokol Chemical Corporation, Trenton, N.J., a corporation of Delaware
No Drawing. Filed Mar. 6, 1963, Ser. No. 263,121
7 Claims. (Cl. 260—653.3)

This invention relates to the purification of fluoroolefin monomers and, more particularly, to a process for purifying monomeric perfluoroolefins and fluorochloroolefins of the minute traces of olefinic impurities which tend to decrease the thermal stability of any polymer produced from such fluoroolefin monomer. The invention also provides an improved process for purifying trifluorochloroethylene and tetrafluoroethylene.

Among the many thermoplastic resins which are presently commercially available, the high molecular weight polyfluoroolefins are generally recognized by many polymer chemists as having outstanding physical characteristics, although they are somewhat difficult to mold because of their high melting points. Frequently, molding polyfluoroolefins such as polytrifluorochloroethylene or polytetrafluoroethylene requires temperatures in excess of 300° C., at which temperatures there is often a tendency for the polymer, upon cooling, to undergo a marked diminution in such physical characteristics as its tensile strength. This phenomenon is especially noticeable when the polymer is subjected to temperatures in excess of 300° C. over prolonged periods of time.

During the exhaustive investigation which we and our colleagues at the laboratories of Osaka Kinzoku Kogyo Co., Ltd., Osaka, Japan, have conducted into various aspects of the production of monomeric fluoroolefins and polyfluoroolefins, we have found that the inability of polyfluoroolefins to withstand heat aging at temperatures in excess of 300° C. without undergoing any change in their physical properties is due to the presence in the fluoroolefin monomer of minute traces of certain olefinic impurities which tend to decrease the thermal stability of any polymer produced from such fluoroolefin monomer. By gas chromatographic analysis of various redistilled fluoroolefin monomers, we have been able to identify these olefinic impurities (which are present in the monomer in concentrations as low as parts per million) as compounds in which the unsaturated carbon atoms contain at least one atom other than fluorine and carbon atoms. Each of these olefinic impurities is characterized by at least one hydrogen atom on one of the unsaturated carbon atoms and, moreover, contains no elements other than carbon, fluorine, chlorine and hydrogen. Apparently, the normal work-up of most fluoroolefin monomers, which are produced either by the pyrolysis of haloperfluoroalkanes or by the dehydrohalogenation of hydrohaloperfluoroalkanes, is insufficient to remove the last minute traces of these olefinic impurities.

We have now found that by treating the fluoroolefin monomer prior to polymerization with a sulfuric anhydride selected from the group consisting of sulfur trioxide, fuming sulfuric acid and the alkali metal pyrosulfates (or any such compound capable of generating sulfur trioxide), it is possible to remove these olefinic impurities from the monomer and thereby improve the thermal stability of the polyfluoroolefin produced by the radical-induced polymerization of the treated monomer.

Based on these discoveries, the invention provides an improved process for purifying a fluoroolefin monomer of the minute traces of olefinic impurities which tend to decrease the thermal stability of any polymer produced from such fluoroolefin monomer, which comprises treating the monomer with a sulfuric anhydride selected from the group consisting of sulfur trioxide, fuming sulfuric acid, and the alkali metal pyrosulfates, to remove from the monomer those olefinic impurities in which the unsaturated carbon atoms contain at least one atom other than fluorine and carbon atoms, thereby improving the thermal stability of the polyfluoroolefin produced by the polymerization of such treated monomer.

Treatment of the fluoroolefin monomer with the sulfuric anhydride may be accomplished in the gaseous or liquid state, using either sulfur trioxide (in any of its polymorphic forms), fuming sulfuric acid, or the alkali metal pyrosulfates, or any compound capable of generating $SO_3$. Although a wide range of process conditions may be employed to purify the fluoroolefin monomer in accordance with the invention, we have obtained particularly satisfactory results by treating the fluoroolefin monomer prior to polymerization with from about 2 to about 10 percent by weight of the sulfuric anhydride at a temperature in the range from ambient room temperatures to about 150° C. for a period of time in the range from about 10 seconds to about 30 minutes, and preferably using about 5 percent by weight of the sulfuric anhydride at temperatures ranging from room temperature to about 100° C. for periods of time in the range from about 30 seconds to about 10 minutes.

The following examples are illustrative of the improvements which are obtained in the thermal stability of polyfluoroolefins when the fluoroolefin monomer is treated prior to polymerization, in accordance with the invention with a sulfuric anhydride to remove the minute traces of olefinic impurities inherently present in such monomer:

EXAMPLE I 1,1,2-trifluoro-2-chloroethylene, which was prepared by dechlorinating 1,1,2 - trifluoro - 1,2,2 - trichloroethane in methanol at reflux temperatures with zinc powder, and initially purified by distilling the monomer and drying over silica gel, was passed through a reaction tube (5 cm in diameter and 150 cm. in length) packed with Raschi rings (5 mm. in diameter and 10 mm. in length) together with 5 percent by weight of sulfur trioxide, over a period of 5 minutes at ambient room temperature and atmospheric pressure. Upon recovery, the treated monomer was washed with water and then dried.

To illustrate the differences in the physical properties of polytrifluorochloroethylene prepared from treated and untreated monomer, two polymer samples (designated as "A" and "B") were prepared under identical reaction conditions by separately polymerizing in vacuo 500 gram of $SO_3$-treated monomer (Sample A) and an equal weight of untreated monomer (Sample B) in a 500-ml. autoclave, using from 0.05 to 0.3 gram of trichloroacetyl peroxide at a temperature of —15° C.±1° C. Each polymer sample was then heat aged at 300° C. and atmospheric pressure and its N.S.T. value (i.e. "no strength temperature") measured before and after the heat treatment, using the method described in the article by W. T. Miller Modern Plastics, p. 146, October 1954. In addition to the measurement of the N.S.T. value in each test, the absorption in the infrared spectrum at 5.31 microns and a 4.43 microns were determined on films (0.1 mm. thick ness) of each polymer sample before and after the heat treatment. Since the absorption band at 5.31 microns characteristic of the

radical, while the band at 4.43 microns is characteristic of polytrifluorochloroethylene, the ratio of absorptions a 5.31 microns with respect to that at 4.43 microns is an indicia of the degree of pyrolysis of the polymer. A ncrease in the N.S.T. value and a decrease in the ratio of absorption $[D_{5.31}/D_{4.43}]$ both are indicative of deterioration of the polymer upon heat treatment. The results of these tests, which are summarized in Table I, clearly demonstrate the improved thermal stability which is obtained in polytrifluorochloroethylene (Sample A) prepared from SO₃-treated monomer when compared to an identical polymer (Sample B) prepared from untreated trifluorochloroethylene.

Table I

THERMAL PROPERTIES OF POLYTRIFLUOROCHLOROETHYLENE PREPARED FROM TREATED AND UNTREATED MONOMER

| Sample | Test No. | Treatment of monomer | N.S.T. Before heat treatment | N.S.T. After heat treatment | Ratio of absorption spectra $D_{5.31}/D_{4.43}$ | Physical appearance |
|---|---|---|---|---|---|---|
| | 1 | Treated with SO₃ | 310 | 317 | 0.069 | Unblistered. |
| | 2 | do | 275 | 283 | 0.057 | Do. |
| | 3 | Untreated | 314 | 277 | 0.199 | Do. |
| | 4 | do | 290 | 275 | 0.121 | Do. |
| | 5 | do | 268 | 243 | 0.141 | Blistered. |

EXAMPLE II

Tetrafluoroethylene, which was prepared by the pyrolysis of chlorodifluoromethane and initially purified by distillation, was passed through a reaction tube packed with Raschig rings together with 5 percent by weight based on the weight of tetrafluoroethylene) of sulfur trioxide, using the same reaction conditions described in Example I. The yield of treated monomer was 98 percent of theory, based on the weight of untreated monomer passed into the reaction tube.

Two polymer samples (again designated as "A" and "B") were prepared under identical reaction conditions by separately polymerizing in vacuo 125 grams of SO₃-treated tetrafluoroethylene (polymer Sample A) and an equal weight of untreated tetrafluoroethylene (polymer Sample B) in a 500-ml. stainless steel autoclave, using a solution in 250-ml. of water of 0.003 gram of potassium persulfate and 0.001 gram of sodium bisulfate to initiate polymerization. The polymerization reaction, which was carried out at temperatures in the range from 0° C. to 5° C. for 3 hours, yielded in each instance 100 grams of polytetrafluoroethylene.

Each polymer sample was then performed under the pressure of 300 kg./cm.² and subjected to heat treatment at 380° C. for periods of time ranging from 0.5 hour to 9 hours. Measurements were made on each sample at the end of the particular heat treatment of its tensile strength at the yielding point and at the breaking point, as well as is percent elongation at the breaking point. The results of these physical tests are summarized in Table II. Analysis of these results show the markedly improved physical properties of polytetrafluoroethylene (Sample A) prepared from SO₃-treated monomer when compared to polymer (Sample B) prepared from untreated tetrafluoroethylene.

EXAMPLE III

Tetrafluoroethylene, which was prepared by the pyrolysis of chlorodifluoromethane and initially purified by distillation, was shaken with 5 percent by weight of fuming sulfuric acid. The organic layer was separated, washed with water, and then polymerized using the same technique and polymerization conditions described in Example II. The resultant polyterafluoroethylene possessed excellent thermal stability.

Although the foregoing examples have illustrated the effectiveness with which the process of the invention may be used to produce polytrifluorochloroethylene and polytetrafluoroethylene, equally satisfactory results may also be obtained by similarly treating other fluoroolefin monomers to remove the minute traces of olefinic impurities which tend to decrease the thermal stability of any polymer produced from such fluoroolefin monomer.

We claim:
1. A process for purifying a fluoroolefin monomer of the group consisting of perfluoroolefins and chloroperfluoroolefins of the minute traces of olefinic impurities which are characterized by at least one hydrogen atom on one of the unsaturated carbon atoms and contain no elements other than carbon, fluorine, chlorine and hydrogen, and which tend to decrease the thermal stability of any polymer produced from such fluoroolefin monomer, which comprises treating the monomer with from about 2 to about 10 percent by weight of a sulfuric anhydride selected from the group consisting of sulfur trioxide, fuming sulfuric acid, and the alkali metal pyrosulfates, at a temperature in the range from ambient room temperatures to about 150° C. for a period of time in the range from about 10 seconds to about 30 minutes to absorb from the monomer substantially all of such olefinic impurities without substantially absorbing the monomer in the sulfuric anhydride, thereby removing substantially all olefinic impurities from the fluoroolefin monomer.

2. A process for purifying monomeric trifluorochloroethylene of the minute traces of olefinic impurities which are characterized by at least one hydrogen atom on one of the unsaturated carbon atoms and contain no elements other than carbon, fluorine, chlorine and hydrogen, and which tend to decrease the thermal stability of any polymer produced from such trifluorochloroethylene monomer, which comprises treating the monomer with from

Table II

PHYSICAL PROPERTIES OF POLYTETRAFLUOROETHYLENE PREPARED FROM TREATED AND UNTREATED MONOMER

| Period of thermal treatment (hrs.) | Tensile strength at yielding point (kg./mm.²) | | Tensile strength at break (kg./mm.²) | | Elongation at break (percent) | | Molecular weight (in ten thousands) | |
|---|---|---|---|---|---|---|---|---|
| | A | B | A | B | A | B | A | B |
| 5 | 1.75 | 1.53 | 1.95 | 2.55 | 270 | 380 | 1,100 | 800 |
| | 1.71 | 1.40 | 2.05 | 1.89 | 260 | 415 | 900 | 600 |
| | 1.70 | 1.27 | 2.05 | 1.44 | 295 | 330 | 900 | 500 |
| | 1.70 | 1.26 | 2.02 | 1.26 | 320 | 115 | 900 | 400 |
| | 1.70 | 1.26 | 2.05 | 1.26 | 305 | 115 | 900 | 400 | about 2 to about 10 percent by weight of a sulfuric anhydride selected from the group consisting of sulfur trioxide, fuming sulfuric acid, and the alkali metal pyrosulfates, at a temperature in the range from ambient room temperatures to about 150° C. for a period of time in the range from about 10 seconds to about 30 minutes to absorb from the monomer substantially all of such olefinic impurities without substantially absorbing the monomer in the sulfuric anhydride, thereby removing substantially all olefinic impurities from the trifluorochloroethylene monomer.

3. A process according to claim 2, in which the monomeric trifluorochloroethylene is treated at a temperature in the range from ambient room temperatures to about 100° C. for a period of time in the range from about 30 seconds to about 10 minutes.

4. A process according to claim 3, in which the monomeric trifluorochloroethylene is treated with about 5 percent by weight of the sulfuric anhydride.

5. A process for purifying monomeric tetrafluoroethylene of the minute traces of olefinic impurities which are characterized by at least one hydrogen atom on one of the unsaturated carbon atoms and contain no elements other than carbon, fluorine, chlorine and hydrogen, and which tend to decrease the thermal stability of any polymer produced from such tertafluoroethylene monomer, which comprises treating the monomer with from about 2 to about 10 percent by weight of a sulfuric anhydride selected from the group consisting of sulfur trioxide, fuming sulfuric acid, and the alkali metal pyrosulfates, at a temperature in the range from ambient room temperatures to about 150° C. for a period of time in the range from about 10 seconds to about 30 minutes to absorb from the monomer substantially all of such olefinic impurities without substantially absorbing the monomer in the sulfuric anhydride, thereby removing substantially all olefinic impurities from the tetrafluoroethylene monomer.

6. A process according to claim 2, in which the monomeric tetrafluoroethylene is treated at a temperature in the range from ambient room temperatures to about 100 C. for a period of time in the range from about 30 seconds to about 10 minutes.

7. A process according to claim 6, in which the monomeric tetrafluoroethylene is treated with about 5 percent by weight of the sulfuric anhydride.

References Cited by the Examiner
UNITED STATES PATENTS

| | | | |
|---|---|---|---|
| 2,613,203 | 10/1952 | Myers | 260—92. |
| 2,613,232 | 10/1952 | Janoski | 260—653. |
| 2,626,254 | 1/1953 | Miller et al. | 260—92. |

OTHER REFERENCES

Newer Methods of Preparative Organic Chemistry pages 208–209, Interscience, N.Y. (1948).

JOSEPH L. SCHOFER, *Primary Examiner.*

J. F. McNALLY, *Assistant Examiner.*